J. CONEY.
MOTOR TRACTOR.
APPLICATION FILED OCT. 19, 1920.

1,379,901.

Patented May 31, 1921.
3 SHEETS—SHEET 1.

Inventor
Joseph Coney

J. CONEY.
MOTOR TRACTOR.
APPLICATION FILED OCT. 19, 1920.

1,379,901.

Patented May 31, 1921.
3 SHEETS—SHEET 3.

Inventor
Joseph Coney
Per
Atty.

UNITED STATES PATENT OFFICE.

JOSEPH CONEY, OF BATH, ENGLAND, ASSIGNOR OF ONE-HALF TO THE LEWIS TRUST LIMITED, OF LONDON, ENGLAND.

MOTOR-TRACTOR.

1,379,901. Specification of Letters Patent. Patented May 31, 1921.

Application filed October 19, 1920. Serial No. 418,095.

*To all whom it may concern:*

Be it known that I, JOSEPH CONEY, a subject of the King of Great Britain and Ireland, residing at 2 Hungerford road, Lower Weston, Bath, in the county of Somerset, England, have invented new and useful Improvements in and Relating to Motor-Tractors, of which the following is a specification.

This invention relates to motor tractors and has for its object certain improvements designed to produce a more efficient and simpler type of this vehicle than heretofore known.

According to the invention the tractor is provided with a single driving wheel which is driven directly from the engine through variable speed gear of the friction-disk type and the various controls are grouped adjacent to a reversible driver's seat and steering column so that the tractor can be steered backward or forward with the same facility. The steering is effected through one of two pinions in engagement with a double rack, one pinion on each side, and the steering column can be changed over to drive either pinion at will, the other pinion then running free. The driving wheel of the tractor is provided with radial arms forked at their outer ends and operated by a cam against spring resistance and so arranged that as they near the ground in the revolution of the driving wheel they gradually protrude from the rim of the latter so as to enter and grip the ground and thus render the driving more efficient. As they leave the ground in the further revolution of the wheel, they are gradually withdrawn through the rim of the wheel, this action serving to scrape off the earth which has collected on the forks at the outer ends.

Further details of construction will be given with reference to the accompanying drawings, in which:—

Figure 1:
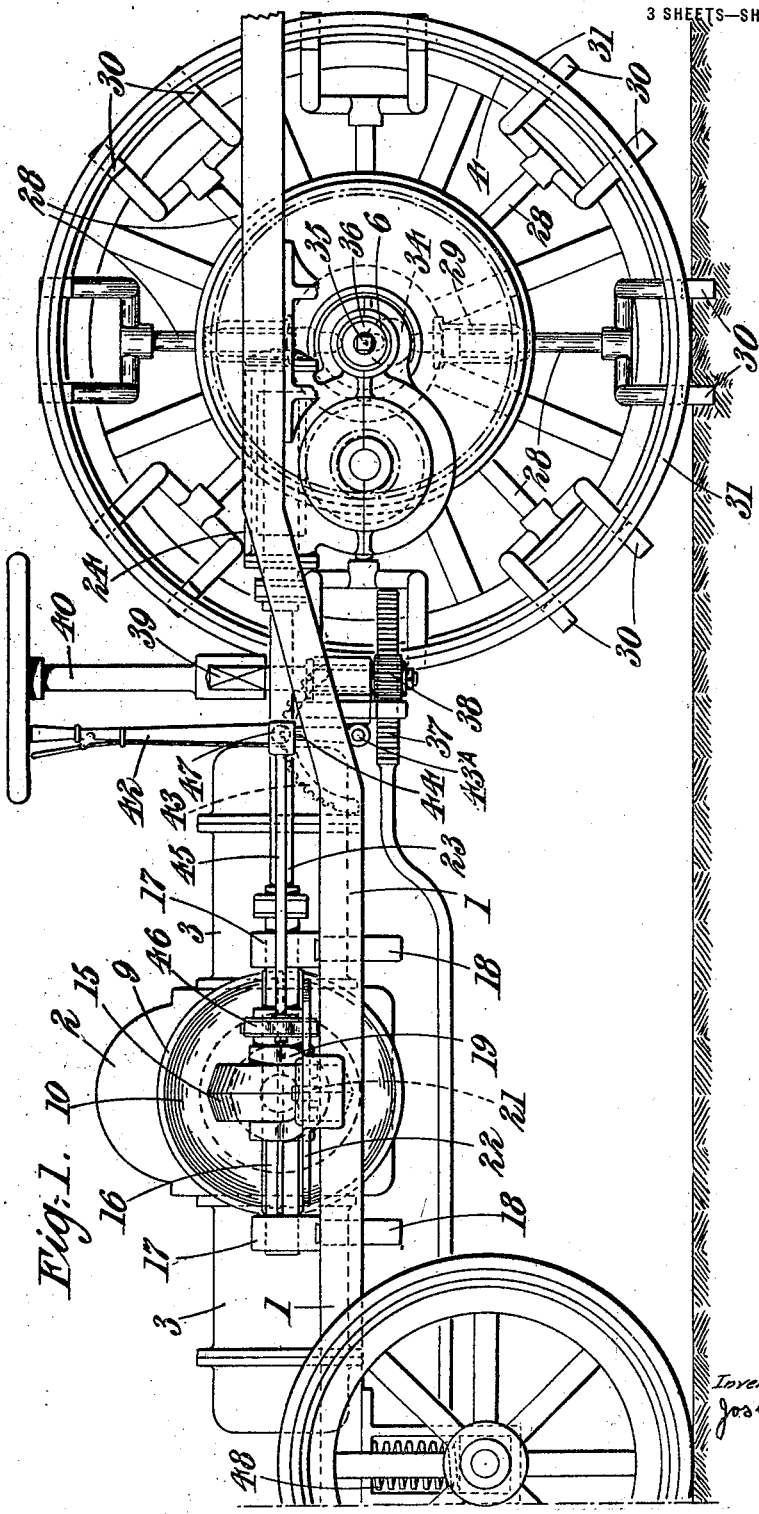
Figure 1 is a side elevation of the tractor.
Figure 2:
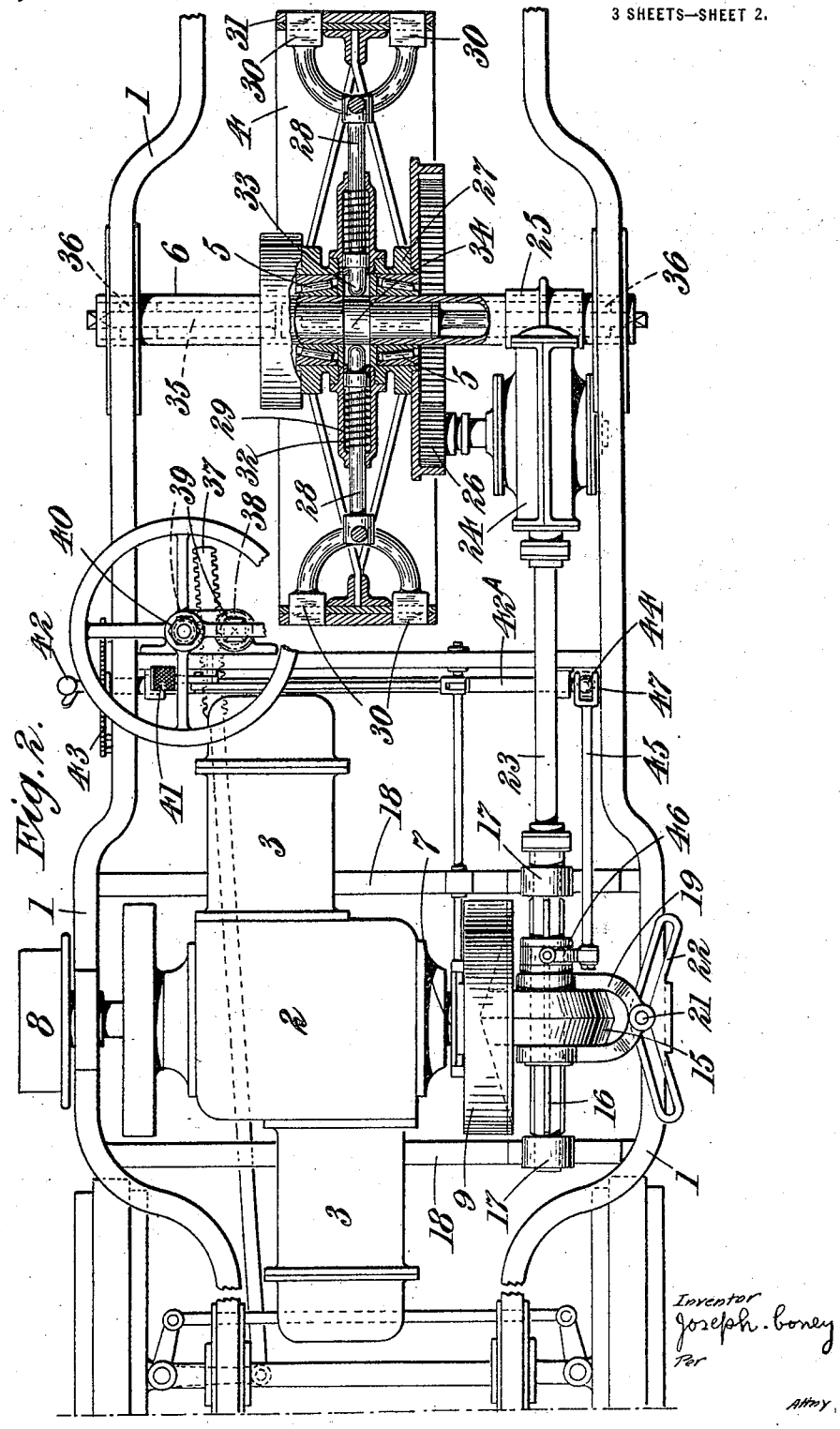
Fig. 2 is a plan corresponding to Fig. 1.

Referring more especially to Figs. 1 and 2 of the drawings the chassis of the tractor is constructed of the usual frame members 1. Upon these is supported in the usual manner the engine 2, which is preferably of the horizontal type with oppositely disposed cylinders 3 of which there may be two or more. At the rear of the chassis framework is a single centrally-disposed driving wheel 4 revolving freely by means of roller-bearings 5 on a fixed hollow axle 6. The wheel 4 is driven from the engine 2 in the following manner.

The crank-shaft 7 of the engine may be provided at one end with a belt pulley 8 for driving machinery and is furnished at the other end with a flywheel and clutch, constituted by a disk 9 keyed to the crankshaft 7 and a face-plate or clutch member 10 having a concial face similar to that of the disk 9.

Figure 3:
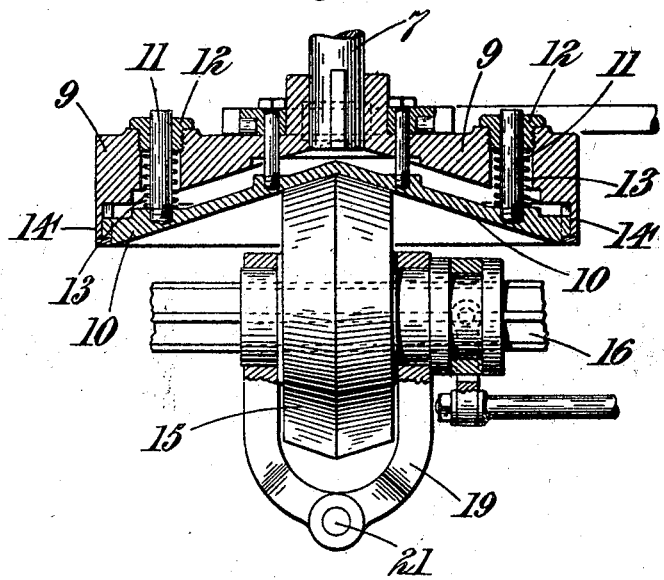
Fig. 3 is a detail view showing more clearly the construction of the variable speed friction gear.

As will be seen more clearly by reference to Fig. 3, the clutch member 10 is provided with short rods 11 which are a sliding fit in glands 12 screwed into the disk 9. The member 10 is thus rotatable by the disk 9 but is kept pressed out of contact with it by coiled springs 13 surrounding the rods 11. A lip 14 on the disk 9 limits the range of action of the springs on the member 10.

The clutch member 10 thus rotated serves to drive by friction the pulley 15 which is shaped to conform with the conicity of the clutch member and is keyed so as to be capable of sliding axially on the countershaft 16. It will be obvious that any movement of the pulley 15 laterally will also involve a component in a direction at right angles thereto owing to the conical formation of the member 10, and in order to allow for this, the countershaft 16 is provided with bearings 17 which work in guides provided upon the cross members 18 of the chassis.

The correct movement of the pulley is further insured by mounting it within a yoke 19 having a roller or equivalent member 21 working in a slotted guide 22 mounted on the chassis frame member 1.

The countershaft 16 is connected to a wormshaft by means of an intermediate shaft 23 and universal joints. The wormshaft is not shown but the casing 24 in which it is inclosed is supported upon the fixed rear axle 6 by means of a sleeve 25. The wormshaft drives a pinion 26 which gears internally with the hub 27 of the driving wheel 4.

Figure 4:
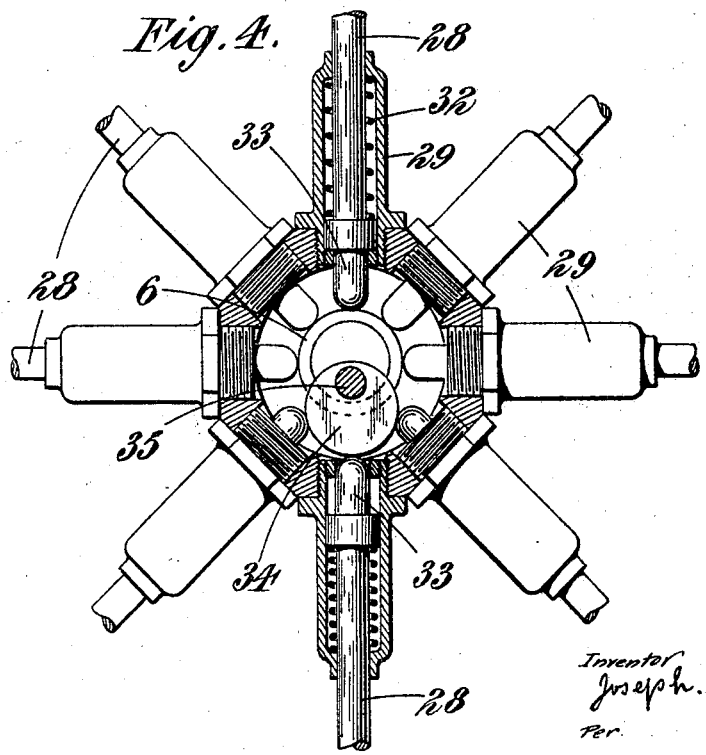
Fig. 4 shows in detail the arrangement of the radial arms of the driving wheel and the manner in which they are operated.

Describing the driving wheel 4 in more detail, it is mainly of ordinary construction, but is provided with radial arms 28 capable of sliding in sockets 29 in the hub of the wheel (Fig. 4) and having forked ends 30 sliding through slots in the rim 31 of the wheel. The arms are normally pressed inward toward the center of the wheel by springs 32 (Fig. 4) coiled around the arms between the reduced ends of the sockets 29 and enlargements 33 on the arms. They are forced outward however as they near the ground in the revolution of the wheel by contact of their inner ends with an eccentrically-mounted disk or cam 34 provided on a spindle 35 within the hollow axle 6. The cam 34 projects downward through a slot in the axle and thus the arms are caused to project as they near the ground and grip or enter the latter thus giving greater driving efficiency. As they pass away from the ground on the further revolution of the wheel they are gradually returned to their innermost positions by the action of the springs 32, and at the same time the earth which may have collected on the forked ends is scraped away by their being drawn back through the rim of the wheel.

The cam 34 may be moved out of the operative position when required. This may be effected by providing the spindle 35 with squared ends which pass through bushes 36 rotatably mounted in the hollow axle 6. By rotating the bushes, which may be effected in any suitable manner, the cam may be completely withdrawn into the hollow axle.

The steering of the vehicle is effected in the following manner. A double rack 37 is provided suitably connected with the front wheels, said rack being in engagement with a pinion 38 on each side. The pinions 38 have short stub axles 39 which are squared or otherwise formed so as to be actuated by a removable steering column 40 which can be changed from one to the other according as it is desired to drive forward or backward. A reversible driver's seat is also provided, so that the tractor can be steered in either direction with the same facility.

The controls are suitably arranged adjacent to the steering column. The pedal 41 controls through suitable levers and rods the de-clutching mechanism for withdrawing the clutch member 10 from the pulley 15 when changing speed or reversing. The construction is clearly seen from Fig. 3. The lever 42 in conjunction with the quadrant 43 is used to control the movement of the friction pulley 15. The angular movement of the lever is transmitted through a rod 43^A and a short arm 44 to the rod 45 having the usual sleeve coupling 46 to the pulley 15. A universal joint is introduced at 47 to allow of the lateral movement of the rod 45 due to the motion along two axes of the pulley.

The front and rear road wheel axles are each held at their ends in axle boxes which are mounted in guides secured to the underside of the chassis. At the ends of each axle helical springs 48 are provided between the axle boxes and the chassis so that all shocks are thereby absorbed.

It will be understood that modifications may be made in the invention without affecting the spirit thereof.

I claim:—

1. A traction device comprising, an axle, a wheel revoluble thereon, traction elements movably mounted in said wheel, and an actuating device mounted in said axle and adapted to engage said elements, and adapted to be completely withdrawn within said axle to inoperative position.

2. A traction device comprising, an axle, a wheel revoluble thereon, traction elements movably mounted in said wheel, and an actuating device mounted in said axle and adapted to engage said elements, and adapted to be completely withdrawn within said axle to inoperative position, and means for withdrawing said actuating device.

3. A traction device comprising, a tubular axle having an opening therein, a wheel revoluble thereon, traction elements movably mounted in said wheel, a spindle revoluble in said axle, an eccentric carried by said spindle and adapted to be projected through the opening in said axle, and means for rotating said spindle to retract said eccentric to inoperative position within said axle.

JOSEPH CONEY.